United States Patent [19]
Banerjee et al.

[11] Patent Number: 5,415,888
[45] Date of Patent: May 16, 1995

[54] METHOD OF IMPRINTING CATALYTICALLY ACTIVE PARTICLES ON MEMBRANE

[75] Inventors: Shoibal Banerjee, Newark, Del.; Walther G. Grot, Chadds Ford, Pa.; David P. Bloomfield, Boston, Mass.

[73] Assignee: E. I. Du Pont de Nemours and Company, Wilmington, Del.

[21] Appl. No.: 51,823

[22] Filed: Apr. 26, 1993

[51] Int. Cl.$^6$ ............................................. B05D 5/12
[52] U.S. Cl. .................... 427/125; 252/514; 427/244; 427/282; 427/421; 427/429; 429/33; 429/42
[58] Field of Search ............... 252/514; 427/244, 125, 427/282, 421, 429; 429/33, 42

[56] References Cited

U.S. PATENT DOCUMENTS

| | | | |
|---|---|---|---|
| 3,134,697 | 5/1964 | Niedrach | 136/86 |
| 3,297,484 | 1/1967 | Niedrach | 136/86 |
| 4,039,409 | 8/1977 | LaConti et al. | 204/129 |
| 4,175,165 | 11/1979 | Aalhart | 429/30 |
| 4,248,682 | 2/1981 | Lindstrom et al. | 204/114 |
| 4,272,353 | 6/1981 | Lawrence et al. | 204/283 |
| 4,319,969 | 3/1982 | Oda et al. | 204/98 |
| 4,654,104 | 3/1987 | McIntyre et al. | 156/276 |
| 4,738,741 | 4/1988 | McMichael | 156/235 |
| 4,826,554 | 5/1989 | McIntyre et al. | 156/280 |
| 4,889,577 | 12/1989 | McMichael et al. | 156/281 |
| 5,039,389 | 8/1991 | McMichael | 204/282 |
| 5,330,860 | 7/1994 | Grot et al. | 429/33 X |

FOREIGN PATENT DOCUMENTS

0031660B1 3/1985 European Pat. Off. .
46300 6/1966 German Dem. Rep. .

OTHER PUBLICATIONS

"Procedure for Preparing Solution Cast Perfluorosulfonate Ionomer Films and Membranes" by R. B. Moore and C. R. Martin, Anal. Chem., 58, pp. 2569–2570 (1986).

"Pseudohomogeneous Catalyst Layer Model for Polymer Electrolyte Fuel Cell" by T. Springer and S. Gottesfeld, Los Alamos Nat'l. Laboratory, Modeling of Batteries and Fuel Cells, ECS, pv91–10, 1991.

"Thin Film Catalyst Layers for Polymer Electrolyte Fuel Cell Electrodes" by M. S. Wilson and S. Gottesfeld, Journal of Applied Electrochemistry 22 (1992) pp. 1–7.

"High Performance Catalyzed Membranes of Ultra-low PT Loadings" by M. S. Wilson and S. Gottesfeld, Journal Electrochem. Soc., vol. 139, No. 2, Feb. 1992, pp. 28–30.

"Methods to Advance Technology of Proton Exchange Membrane Fuel Cells" by S. Srinivasan et al., Los Alamos Nat'l. Laboratory (Sep. 1987).

Primary Examiner—Michael Lusignan

[57] ABSTRACT

A membrane and electrode structure is formed by applying ink of catalytically active particles on the surface of the membrane. The electrode ink comprises:
  (a) catalytically active particles;
  (b) a hydrocarbon having at least one ether, epoxy or ketone linkage and an alcohol group, preferably 1 methoxy 2 propanol; and
  (c) optionally, perfluorinated sulfonyl fluoride polymer or perfluorinated sulfonic acid polymer.

20 Claims, No Drawings

METHOD OF IMPRINTING CATALYTICALLY ACTIVE PARTICLES ON MEMBRANE

FIELD OF THE INVENTION

This invention relates to a method for making a membrane and electrode structure composed of an ion exchange membrane having a plurality of electrically conductive, catalytically active particles present on one, or both, surfaces of an ion exchange membrane. The electrically conductive, catalytically active particles serve as a particulate electrode when the membrane and electrode structure are used in an electrochemical cell. The membrane and electrode structures are particularly useful in fuel cells.

BACKGROUND OF THE INVENTION

So-called "M & E cells" are electrochemical cells employing a membrane and electrode structure. Such cells can be operated as an electrolytic cell for the production of electrochemical products, or they may be operated as fuel cells for the production of electrical energy, gas generating devices and processes, chemical synthesis devices, chemical treatment and processing devices and methods, gas dosimeters and sensing devices and the like. Electrolytic cells may, for example, be used for the electrolysis of an alkali metal halide such as sodium chloride or for the electrolysis of water. M & E cells are well known in the art.

The contact of the gas-liquid permeable porous electrode with the ion exchange membrane is an important factor for the efficiency of the M & E cell. When the thickness of an electrode is nonuniform or the contact between the electrode with the ion exchange membrane is not satisfactory, a part of the electrode is easily peeled off adversely effecting the electrical properties of the cell. The advantages of the M & E structure are then decreased or lost.

Membrane and electrode structures are currently manufactured by several techniques. U.S. Pat. No. 3,297,484 illustrates in detail materials for electrode structures including exemplary catalyst materials for electrodes, ion exchange resins for membrane and electrode structures and current collecting terminals. Catalytically active electrodes are prepared from finely-divided metal powders, customarily mixed with a binder such as polytetrafluoroethylene resin. The electrode is formed from a mixture of resin and metal bonded upon one or both of the surfaces of a solid polymer matrix, sheet or membrane.

In U.S. Pat. No. 3,297,484, the mixture of resin and catalytically active particles is formed into an electrode structure by forming a film from an emulsion of the material, or alternatively, the mixture of resin binder and catalytically active particles is mixed dry and shaped, pressed and sintered into a sheet which can be shaped or cut to be used as the electrode. The mixture of resin and catalytically active particles may also be calendered, pressed, cast or otherwise formed into a sheet, or fibrous cloth or mat may be impregnated and surface coated with the mixture. In U.S. Pat. No. 3,297,484, the described electrodes are used in fuel cells. In U.S. Pat. No. 4,039,409, the bonded electrode structure made from a blend of catalyst and binder is used as the electrode in a gas generation apparatus and process.

In U.S. Pat. No. 3,134,697, many ways are described for incorporating catalytically active electrodes into the surfaces of an ion exchange membrane. In one embodiment, as explained above, the electrode material made of catalytically active particles and a resin binder may be spread on the surface of an ion exchange membrane or on the press platens used to press the electrode material into the surface of the ion exchange membrane, and the assembly of the ion exchange membrane and the electrode or electrode materials is placed between the platens and subjected to sufficient pressure, preferably at an elevated temperature, sufficient to cause the resin in either the membrane or in admixture with the electrode material either to complete the polymerization if the resin is only partially polymerized, or to flow if the resin contains a thermoplastic binder.

It is known to add binders, such as fluorocarbon polymers including polytetrafluoroethylene and polyhexylfluoroethylene, to the electrode ink. It is also known to add viscosity regulating agents such as soluble viscous materials to the electrode ink.

A method to construct membrane and electrode structures is also described in "Methods to Advance Technology of Proton Exchange Membrane Fuel Cells;" E. A. Ticianelli, C. Derouin, A. Redondo and S. Srinivasan presented at Second Symposium "Electrode Materials and Processes for Energy Conversion and Storage," 171st Electrochemical Society Meeting, May, 1987. In this approach, a dispersion of a flocculent precipitate of 20% platinum on a catalyst and TEFLON ® (commercially available from E. I. du Pont de Nemours and Company) is prepared. The flocced mixture is cast onto paper and then pressed onto a carbon paper substrate. The electrodes may then be sintered at elevated temperature, approximately 185° C., for 30 minutes. The electrode is next brushed with a solution of chloroplatinic acid and subsequently reduced with an aqueous mixture of sodium borohydride.

The electrode is then washed and NAFION ® (commercially available from E. I. du Pont de Nemours and Company) solution brushed on the surface of the electrode. The method of solution processing is described in "Procedure for Preparing Solution Cast Perfluorosulfonate Ionomer Films and Membranes," R. B. Moore and C. R. Martin, Anal. Chem., 58, 2569 (1986), and in "Ion Exchange Selectivity of NAFION ® Films on Electrode Surfaces," M. N. Szentirmay and C. R. Martin, Anal. Chem., 56, 1898 (1984). The so-called NAFION ® solution may be made from a solvent which is, for example, a lower-boiling alcohol such as propanol or a high-boiling alcohol such as ethylene glycol. In the case of the higher-boiling alcohol, the treated electrode is heated to about 140° C. in an inert gas to drive off the alcohol. The electrodes are then washed in hot hydrogen peroxide solution and then in nitric acid. This NAFION ® impregnation step is followed by hot pressing the electrodes onto an ion exchange membrane for a sufficient time at suitable temperatures and pressures.

Using transfer catalyzation wherein an electrode ink comprising a platinum catalyst on a carbon supporting material is printed on a suitable substrate, such as TEFLON ® or paper, it has been possible to form electrodes containing as little as 0.2 mgm/cm$^2$ of precious metal. In particular, these electrodes, which are essentially decals formed from a supported platinum catalyst electrode ink are painted or sprayed on the substrate and then dried and hot pressed onto ion exchange membranes. This so-called decal process of applying the electrode ink to the surface of the membrane has been successful but involves the arduous process steps of forming the electrode decal and then transferring it to the membrane.

In all of the foregoing techniques, it has been necessary to utilize liquid-based emulsion and several processing steps to form a film of the electrode material and thereafter bind or press the sheet of electrode material upon the ion exchange membrane, or it has been necessary to use binders and substantial quantities of expensive catalyst materials to prepare membrane and electrode structures. It has also been necessary to utilize large loadings of catalyst to make acceptable electrodes in these prior art methods. The process for preparing the electrodes is inefficient and the reproducibility is poor.

By prior art techniques, it has been impossible to prepare membrane and electrode structures having loadings of the unsupported catalyst materials as low as 3.0 mg per $cm^2$ or even lower with no compromise in the integrity of the membrane or the performance of the membrane and electrode structure in various fuel cells, gas generating systems and other devices.

U.S. Pat. No. 4,272,353 tries to solve some of these problems by abrading or physically roughening the surface of the membrane to provide a support for locking, uniting or fixing the finely-divided catalyst particles to the surface of the membrane. Particularly, before the catalyst is deposited upon the surface of the membrane, the surface is subjected to a suitable abrading or roughening means. However, the abrasion process can result in deleterious effects to the strength, dimensional stability and electrical properties of the membrane. Moreover, abrading the membrane requires an additional process step.

Moreover, directly applying catalyst inks to a membrane which is in the proton form has been largely unsuccessful. The alcohol carrier causes swelling and distortion of the membrane onto which it is applied.

It is also known to incorporate additives into the ink composition in order to form a suspension of the catalytically active particles and/or binder agents. Additives such as tetrabutyl ammonium hydroxide glycerols and ethylene glycol are known additives which facilitate the printing of the electrode ink onto the surface of the membrane, but such additives adversely interact with many binders and the ion exchange polymers contained in the membrane.

Therefore, a method of making a membrane and electrode structure is needed in which the electrode may be efficiently, inexpensively, and reproducibly applied to an ion exchange membrane, so as to form a uniform electrode structure which uses a relatively small loading of catalyst, does not crack or deform during operation, does not adversely decrease ionic conductivity of the structure, does not effect the strength of the structure and does not adversely interact with the ion exchange polymer contained in the membrane.

SUMMARY OF THE INVENTION

The present invention is a method of making membrane and electrode structure having excellent characteristics which is formed by bonding the electrode to the membrane by a printing process using an ink comprising
a) catalytically active particles (supported or unsupported), preferably 5–40% by weight;
b) a suspension medium comprising a hydrocarbon having an ether, epoxy or ketone linkage and an alcohol group, which is preferably nonsolid at processing temperatures, preferably 50–95% by weight, such suspension medium preferably being 1-methoxy 2- propanol ("MOP");
c) optionally, binders such as perfluorinated sulfonyl fluoride polymer, preferably 0–25% by weight, such polymer preferably being NAFION ® perfluorinated sulfonyl fluoride polymer (commercially available from E I. du Pont de Nemours and Company), preferably in a solution of hydrocarbon solvent, or perfluorinated sulfonic acid polymer, preferably 0–25% by weight, such polymer preferably being NAFION ® perfluorinated sulfonic acid (commercially available from E. I. du Pont de Nemours and Company), preferably in a solution of isopropyl alcohol and water.

The electrode ink is printed, coated or bonded onto the surface of the membrane. The electrode ink may optionally be pressed onto the surface of the membrane at elevated pressure and temperature. In an alternate embodiment the electrode ink is printed, painted or sprayed on a suitable substrate to form a so-called "decal." The decal is then hot pressed onto the surface of the ion exchange membrane. The ink readily adheres to the membrane thereby reducing the likelihood of delamination of the electrode structure, uniform application of the electrode layer, reduction in the formation of gas bubbles at the membrane/electrode interface and without adversely effecting the strength, dimensional stability or electrical properties of the membrane.

The inventive membrane and electrode structure made by the inventive process is particularly useful in fuel cells.

DETAILED DESCRIPTION OF THE INVENTION

The membrane and electrode structure of the present invention has electrode ink comprising the following composition:
a) catalytically active particles (supported or unsupported), preferably 5–40% by weight;
b) a suspension medium comprising a hydrocarbon having an ether, epoxy or ketone linkage and an alcohol group, which is preferably nonsolid at processing temperatures, preferably 50–95% by weight, such suspension medium preferably being 1-methoxy, 2-propanol ("MOP");
c) optionally, binders such as perfluorinated sulfonyl fluoride polymer, preferably 0–25% by weight, such polymer preferably being NAFION ® perfluorinated sulfonyl fluoride polymer (commercially available from E I. du Pont de Nemours and Company), preferably in a solution of hydrocarbon solvent, or perfluorinated sulfonic acid polymer, preferably 0–25% by weight, such polymer preferably being NAFION ® perfluorinated sulfonic acid (commercially available from E. I. du Pont de Nemours and Company), preferably in a solution of isopropyl alcohol and water.

The electrode layer can be made from well-known catalytically active particles or materials. The anode is preferably formed by one or more platinum group metal such as platinum, ruthenium, rhodium, and iridium and electroconductive oxides thereof, and electroconductive reduced oxides thereof. The cathode is preferably formed by one or more of iron, nickel, stainless steel, a thermally decomposed product of a fatty acid nickel salt, Raney nickel, stabilized Raney nickel, carbonyl nickel and carbon powder supporting a platinum group metal. The catalyst may be supported or unsupported. The preferred catalyst is a platinum catalyst (manufactured by Precious Metals Corp.), particularly 20% platinum on a carbon support known as VULCAN ® (manufactured by Cabot Corp.).

The catalytically active material is conventionally incorporated in the ink in a form of a powder having a particle diameter of 100 Angstroms to 1000 Angstroms, especially 120 Angstroms to 500 Angstroms.

A hydrolyzed or unhydrolyzed sulfonyl fluoride polymer, preferably a polymer solution, is incorporated in the ink. The polymer is typically used as a binder for the electrode and the ion exchange membrane. The polymer facilitates the bond between the electrode ink and the surface of the membrane without significantly impairing or reducing the ionic conductivity of the membrane and electrode structure.

The sulfonyl polymers (and the corresponding perfluorinated sulfonic acid polymers) with which the present invention is concerned are fluorinated polymers with side chains containing the group $-CF_2CFR_fSO_2X$, wherein $R_f$ is F, Cl, $CF_2Cl$ or a $C_1$ to $C_{10}$ perfluoroalkyl radical, and X is F or Cl, preferably F. Ordinarily, the side chains will contain $-OCF_2CF_2CF_2SO_2X$ or $-OCF_2CF_2SO_2F$ groups, preferably the latter. For use in chloralkali membranes, perfluorinated polymers are preferred. Polymers containing the side chain $-OCF_2CF\{CF_3\}O_k-(CF_2)j-SO_2F$, where k is 0 or 1 and j is 2, 3, 4, or 5, may be used. Polymers may contain the side chain $-CF_2CF_2SO_2X$ where X is F or Cl, preferably F.

Preferred polymers contain the side chain $-(OCF_2CFY)_r-OCF_2CFR_fSO_2X$, where $R_f$, Y and X are defined above and r is 1, 2, or 3. Especially preferred are copolymers containing the side chain $-OCF_2CF\{CF_3\}OCF_2CF_2SO_2F$. Other suitable binders include fluorocarbon polymers such as polytetrafluoroethylene and polyhexylfluoroethylene. In order to improve the dispersibility, it is possible to incorporate a long chain hydrocarbon type surfactant or a fluorinated hydrocarbon type surfactant at a desired ratio.

The suspension medium is a hydrocarbon having an ether, epoxy or ketone linkage and an alcohol group, which is nonsolid at processing temperatures. The preferred suspension medium is MOP. Other suitable suspension media include 1-ethoxy-2-propanol; 1-methoxy 2-methyl 2-propanol; 1-isopropoxy 2-propanol; 1-propoxy 2-propanol; 2-phenoxy 1-propanol; 2-ethoxy 1-propanol; 2,3-ethoxy 1-propanol; 2-methoxy 1-propanol; 1-butoxy 2-propanol; or mixtures thereof. In the foregoing examples, the propanol constituent may be substituted with other alcohols, for example, ethanol or butanol.

The suspension media of the present invention are particularly useful because they act as a solvent, carrier or suspension agent for the catalytically active particles and the perfluorosulfonic acid polymer (or the perfluorinated sulfonyl fluoride polymer). Moreover, the suspension media do not significantly interact with the functional groups of the perfluorosulfonic acid polymer (or the perfluorinated sulfonyl fluoride polymer) which could impair or reduce the ionic conductivity of the membrane and electrode structure during operation. In addition, the suspension media act as a viscosity regulating which facilitates the printing or coating of the electrode ink on the surface of the membrane, without interacting with the ion exchange polymers contained in the membrane.

The preferred contents of the catalytically active particles and the ion exchange polymer in the ink are dependant upon characteristics of the electrode. In the case of fuel cell electrodes, the preferred ratio of ion exchange polymer to carbon support weight of the catalyst is in the ratio of about 1:3.

The viscosity of the ink comprising the electrode powder is preferably controlled in a range of 1 to $10^2$ poises especially about $10^2$ poises before printing. The viscosity can be controlled by (i) selecting particle sizes, (ii) composition of the catalytically active particles and binder, (iii) a content of water as the medium or (iv) preferably by incorporating a viscosity regulating agent.

Suitable viscosity regulating agents include cellulose type materials such as carboxymethyl cellulose, methyl cellulose, hydroxyethyl cellulose, and cellulose and polyethyleneglycol, polyvinyl alcohol, polyvinyl pyrrolidone, sodium polyacrylate and polymethyl vinyl ether.

The amount of catalyst material which is deposited upon the surface of the membrane in accordance with the process of the present invention is not critical. In a publication entitled "Pseudohomogeneous Catalyst Layer Model for Polymer Electrolyte Fuel Cell," T. Springer and S. Gottesfeld, Los Alamos National Laboratory, Modeling of Batteries and Fuel Cells, Electrochemical Society, PV91-10, 1991, it was shown that fuel cell electrode thickness should be constructed to be about 5 microns thick. This thickness provides a balance between proton conductivity and oxygen permeability in the polymer of the catalyst layer. It has been found in accordance with the present invention that the ink of the present invention permits the deposition of surprisingly small quantities of catalyst material upon the surface of the membrane. This value includes the weight of the precious metal catalyst and excludes the support. In accordance with the present invention, catalyst particles may be deposited upon the surface of a membrane in a range from about 0.2 mg. catalyst/cm$^2$ (supported) up to about 20 mg/cm$^2$ (unsupported) and higher. However, at higher loadings, that is loadings of catalyst over about 2.0 mg/cm$^2$, it may be more important to add a binder to cause better adhesion or fixing of the catalyst material upon the surface. However, binders are optional and are not required for structural integrity at loadings of catalyst of about 2.0 mg/cm$^2$ or less.

Catalyst is added to the surface of the membrane in an ink or ink form. The area of the membrane, which may be the entire area or only a select portion of the surface of the membrane, is covered with the catalytic material. The exact amount of catalyst may be placed upon the surface of the membrane, that is, the desired loading. If necessary, appropriate steps may be taken to remove the excess catalyst material, such as by vibration, electrostatics, shaking, pouring, brushing, vacuum, and the like. The catalyst ink may be deposited upon the surface of the membrane by spreading it with a knife or blade, brushing, pouring, dusting, electrostatics, vibrating and the like. Areas upon the surface of the membrane which require no catalyst material, can be masked, or other means can be taken to prevent the deposition of the catalyst material upon such areas. The desired loading of catalyst upon the membrane can be predetermined, and the specific amount of catalyst material can be deposited upon the surface of the membrane so that no excess catalyst is required. For example, if 0.25 mg/cm$^2$ catalyst is desired upon the surface of the membrane, that specific amount of catalyst material can be deposited upon the surface and fixed thereon. In this manner, any waste of relatively expensive catalyst materials can be avoided.

There are a number of suitable ways for depositing the particles onto the membrane. For example, one can form a slurry of the catalytically active particles and paint or spray the slurry onto the membrane. Spraying the solution/dispersion onto the flat electrically conductive screen is used to advantage for covering large or irregular shapes. Pouring the solution/dispersion onto the membrane is sometimes used. Painting the solution/dispersion with brush or roller has been successfully employed. In addition, coatings may be easily applied with metering bars, knives, or rods. Usually, the coatings or films are built up to the thickness desired by repetitive application.

A particular advantageous method of applying the catalytic particles to the membrane is to blend the ink which is to be imprinted on the surface of the membrane. The ink is printed on and bonded to the surface of the ion exchange membrane by the screen printing process. The conventional screen printing process can be employed. It is preferable to use a screen having mesh number of 10 to 2400 especially mesh number of 50 to 1000 and a thickness of 1 mil to 100 mils, especially 5 mils to 15 mils. When the mesh number is too large, the clogging of the screen results in nonuniform printing. When the mesh number is too small, excess of the ink is printed. When the thickness is too thick, too heavy a coating is caused. When the thickness is too thin, a printing for a desired amount of the ink is not attained. A screen mask is used for forming an electrode layer having a desired size and configuration on the surface of the ion exchange membrane. The configuration is preferably a printed pattern eliminating the configuration of the electrode. The thickness of screen mask is preferably in a range of 1 to 500 mu. The substances for the screen and the screen mask can be any materials having satisfactory strength such as stainless steel, polyethyleneterephthalate and nylon for the screen and epoxy resins for the screen mask.

A screen and the screen mask are placed on the ion exchange membrane for the printing of the electrode layer. The ink is fed on the screen and is printed under a desired pressure by squeegee whereby the electrode layer having the configuration beside the screen mask, is formed on the surface of the membrane. The thickness of the electrode layer on the membrane depends on the thickness of the screen, the viscosity of the ink and the mesh number of the screen. It is preferable to control the thickness of the screen, the viscosity of the ink and the mesh of the screen so as to give the thickness of the electrode ranging from 1 micron to 50 microns, especially 5 microns to 15 microns.

The gap between the screen and the membrane, the material of the squeegee and the pressure applied to mesh by the squeegee in the screen printing process, highly relate to the physical properties, thickness and uniformity of the electrode layer to be formed on the surface of the membrane. In order to give desired printing, the gap between the screen and the membrane is set depending upon the kind and viscosity of the ink preferably ranging from 0.5 mm to 5 cm. The hardness of the squeegee is selected according to the viscosity of the ink, preferably ranging from 50 to 100 shore hardness. Preferably, uniform pressure of the squeegee is applied to the mesh. Thus, the electrode layer having uniform thickness is formed on one or both of the surfaces of the membrane in a high bonding strength. Thereafter, it is preferable to warm the electrode layer to about 50° C. to 140° C., preferably about 75° C. The electrode layer may be warmed by a lamp, usually about one foot away from the membrane or by other conventional means. This screen printing process may be repeated until the desired loading of ink is achieved. Two to four passes, usually three passes, produce the optimum performance.

Thereafter, it is preferable to fix the ink on the surface of the membrane. The ink may be fixed upon the surface of the membrane by any one or a combination of pressure, heat, adhesive, binder, solvent, electrostatic, and the like. The preferred embodiment for fixing the ink upon the surface of the membrane are by pressure, by heat or by a combination of pressure and heat. Pressure and heat may be adjusted by one skilled in the art. It is preferable to press the electrode layer on the surface of the membrane at 100° C. to 300° C., preferably 150° C. to 280° C., most preferably 130° C. under a pressure of 5 10 to 51,000 kPa (5 to 500 atm) preferably 1015 to 101,500 kPa (10 to 100 atm), most preferably 2030 kPa (20 atm) whereby a strongly bonded structure of the electrode layer and the ion exchange membrane can be obtained.

The electrode layer formed on the membrane should preferably be a gas permeable porous layer. The average pore diameter is in a range of 0.01 to 50 m$\mu$, preferably 0.1 to 30 m$\mu$. The porosity is generally in a range of 10 to 99%, preferably 10 to 60%.

When heat is used to fix the ink upon the surface of the membrane, temperatures of about 80° C. up to less than the decomposition temperature of the membrane are preferred. Pressure may be carried out by manual presses, flat plate presses, a roller or rollers pressing against a flat plate backup member or a roller or rollers pressing against a backup roller or rollers or by any suitable means of applying pressure, manually or automatically. Elevated temperatures suitable for fixing the particles upon the surface may be achieved by heating the membrane having catalyst ink upon the surface in an oven or other suitable heating device, by heating a pressure plate or plates, by heating a pressure roll or rollers, by external heat lamps, or by any other suitable heating de-vices or combination of the foregoing. When pressure and heat are applied simultaneously, the heating device may be incorporated in the pressure device such as the pressure plate or the pressure roller or rollers, or there may be any suitable combination of external sources of heat used in conjunction with pressure devices.

Generally, the length of time for the application of heat is not critical and is dependent upon the temperature and/or pressure being applied to the surface of the membrane having catalyst particles or powder deposited thereon. Typically, heat is applied from less than about 1 minute to about 2 hours, and when a pressure of about 2030 kPa (20 atm) is used with a temperature of about 130° C., heat is applied for less than about 1 minute to about 15 minutes, preferably about two minutes.

In preferred embodiments, any pressure plate or roller surfaces used to fix the particles of catalyst materials upon the surfaces of the membrane may have a release surface, such as a coating of TEFLON ®, fluorocarbon or other suitable release material thereon.

The electrode structure may also be applied to the surface of the membrane by the so-called decal process.

In particular, an alternative to printing the catalyst layer directly onto the membrane electrolyte is to coat, paint, spray or screen print the catalyst onto a piece of substrate or paper and subsequently transfer the catalyst from the paper to the membrane. A version of this process is well known in fuel cell art. In this process the ink formulation is prepared and preferably mixed with water and an amount of TEFLON®, preferably TEFLON® 30B (commercially available from E. I. du Pont de Nemours and Company) is added. TEFLON® should constitute 10% to 70%, preferably 30% to 50% of the catalyst layer dry weight. The mixture is flocced using heat or by acidification. The mixture is cast onto a piece of paper by a vacuum filtration. The water is withdrawn through the paper leaving the solid, flocced filtrate in a uniform layer on the paper. This paper is then placed, catalyst side down, on a piece of teflonated or wetproofed carbon paper. The carbon paper, catalyst layer and catalyst-layer paper backing are sandwiched between sheets of filter paper and the excess water is pressed out. The assembly is removed from the press and the filter paper is discarded. The paper is now sprayed lightly with water causing the paper fibers to swell. The paper can now be removed and what remains is a TEFLON®-bonded, diffusion-type fuel cell electrode. The electrodes are generally dried and sintered at about 332° C. for about 15 to 30 minutes.

It is also possible to print the electrode onto a paper backing as described in the prior art. After the ink is dried, two such printed papers are placed on either side of a fluorinated ion exchange membrane which is preferably in the unhydrolyzed form, typically the sulfonyl fluoride form. The papers are placed so that the printed areas are placed facing the membrane. The membrane usually being transparent and the paper being somewhat translucent, permits easy registry of the two printed catalyst layers. The sandwich so formed is placed between the heated platens of a press. The press is closed and raised to a pressure of about 1380 kPa (200 psi) at the surface of the membrane and to a temperature of about 127° C. This condition is maintained for about 2 minutes after which the membrane and electrode structure package is withdrawn. To remove the paper from the membrane and electrode structure, water may be sprayed on the paper which causes the fibers to swell. The paper can now be peeled from the catalyst layer which is now firmly bonded to the membrane.

The advantage of the decal approach is that it permits the removal of most ink solvents prior to pressing. These processes have also yielded layers which are less subject to mudcracking. The approach simplifies fixturing the membrane for printing. It also permits printing and storage of large quantities of catalyst layer, which also facilitates the production of customized membrane and electrode structures.

The membrane on which the electrode layer is formed is not limiting. It can be made of a polymer having ion exchange groups such as carboxylic acid groups, sulfonic acid groups, phosphoric acid groups and phenolic hydroxy groups. Suitable polymers include copolymers of a vinyl monomer such as tetrafluoroethylene and chlorotrifluoroethylene and a perfluorovinyl monomer having an ion-exchange group such as sulfonic acid group, carboxylic acid group and phosphoric acid group or a reactive group which can be converted into the ion-exchange group. It is also possible to use a membrane of a polymer of trifluoroethylene in which ion-exchange groups such as sulfonic acid group are introduced or a polymer of styrene-divinyl benzene in which sulfonic acid groups are introduced.

The ion exchange membrane is preferably made of a fluorinated polymer. The term "fluorinated polymer" generally means a polymer in which, after loss of any R group by hydrolysis to ion exchange form, the number of F atoms is at least 90% of the total number of F, H and Cl atoms in the polymer. For chloralkali cells, perfluorinated polymers are preferred, through the R in any —COOR group need not be fluorinated because it is lost during hydrolysis. The fluorinated polymers are preferably so-called carboxyl polymers or so-called sulfonyl polymers.

The carboxyl polymers have a fluorocarbon backbone chain to which are attached the functional groups or pendant side chains which in turn carry the functional groups. When the polymer is in melt-fabricable form, the pendant side chains can contain, for example —[—$CFZ$—]$_t$—W groups wherein Z is F or $CF_3$, t is 1 to 12, and W is —COOR or —CN, wherein R is lower alkyl. Preferably, the functional group in the side chains of the polymer will be present in terminal O—[—$CFZ$—]$_t$—W groups wherein t is 1 to 3.

Polymers containing —($OCF_2CF\{CF_3\}$)$_m OCF_2CF(CF_3)CN$ side chains, in which m is 0, 1, 2, 3, or 4, are disclosed in U.S. Pat. No. 3,852,326. Polymers may contain —($CF_2CFZ$)$_m OCF_2COOR$ side chains, where Z and R have the meaning defined above and m is 0, 1, or 2 (preferably 1).

Polymers containing terminal —$O(CF_2)_v$W groups, where W is defined as —COOR or —CN and v is from 2 to 12 are preferred. These groups may be part of —($OCF_2CFY$)$_m$—O—($CF_2$)$_v$—W side chains, where Y=F, $CF_3$ or $CF_2Cl$. Especially preferred are polymers containing such side chains where v is 2, and where v is 3. Among these polymers, those with m=1 and Y=$CF_3$ are most preferred. The above references also describe how to make these fluorinated ion exchange polymers.

The fluorinated polymer may also be so-called sulfonyl polymers. The sulfonyl polymers with which the present invention is concerned are fluorinated polymers with side chains containing the group —$CF_2CFR_f SO_2X$, wherein $R_f$ is F, Cl, $CF_2Cl$ or a $C_1$ to $C_{10}$ perfluoroalkyl radical, and X is F or Cl, preferably F. Ordinarily, the side chains will contain —$OCF_2CF_2SO_2X$ or —$OCF_2CF_2SO_2F$ groups, preferably the latter. For use in chloralkali membranes, perfluorinated polymers are preferred. Polymers containing the side chain —$OCF_2CF\{CF_3\}O)_k$—($CF_2$)$_j$—$SO_2F$, where k is 0 or 1 and j is 3,4, or 5, may be used. Polymers may contain the side chain —$CF_2CF_2SO_2X$ where X is F or Cl, preferably F. The above references also describe how to make these fluorinated ion exchange polymers.

Preferred polymers contain the side chain —($OCF_2CFY$)$_r$—$OCF_2CFR_f SO_2X$, where $R_f$, Y and X are defined above and r is 1, 2, or 3. Especially preferred are copolymers containing the side chain —$OCF_2CF\{CF_3\}OCF_2CF_2SO_2F$.

Polymerization can be carried out by the methods known in the art. Especially useful is solution polymerization using $ClF_2CFCl_2$ solvent and $(CF_3CF_2COO)_2$ initiator. Polymerization can also be carried out by aqueous granular polymerization, or aqueous dispersion polymerization followed by coagulation.

The perfluoro ion exchange polymer is a copolymer of tetrafluoroethylene with one of the functional comonomers disclosed herein. The ratio of tetrafluoroethylene to functional comonomers on a mole basis is 1.5 to 5.6: 1. For each comonomer, the most preferred ratio of tetrafluoroethylene to functional comonomers is determined by experiment. Copolymers with high ratios of tetrafluoroethylene to comonomers are less soluble than those with low ratios. It is desirable to have a liquid composition with most micelles of less than 100 Angstroms, but an alternative is to remove the larger micelles by filtration or centrifugation.

The polymer of the ion exchange membrane may also be formed from copolymers of monomer I with monomer II (as defined below). Optionally, a third type of monomer may be copolymerized with I and II.

The first type of monomer is represented by the general formula:

$$CF_2=CZZ' \tag{I}$$

where:

Z and Z' are independently selected from the group consisting of —H, —Cl, —F, or —CF$_3$.

The second type of monomer consists of one or more monomers selected from compounds represented by the general formula:

$$Y-(CF_2)_a-(CFR_f)_b-(CFR_f)_c-O-[CF(CF_2X)-CF_2-O]_n-CF=CF_2 \tag{II}$$

where

Y is selected from the group consisting of —SO$_2$Z, —CN, —COZ, and C(R$^3$f)(R$^4$f)OH;

Z is —I, —Br, —Cl, —F, —OR, or —NR$_1$R$_2$;

R is a brached or linear alkyl radical having from 1 to about 10 carabon atoms or an aryl R$^3$f and R$^4$f are independently selected from the group consisting of perfluoroalkyl radicals having from 1 to about 10 carbon atoms;

R$^1$ and R$^2$ are independently selected from the group consisting of —H, a branched or linear alkyl radical having from 1 to about 10 carbon atoms or an aryl radical;

a is 0–6;

b is 0–6;

c is 0 or 1;

provided a+b+c is not equal to 0;

X is —Cl, —Br, —F, or mixtures thereof when n>1;

n is 0 to 6; and

R$_f$ and R$_f'$ are independently selected from the group consisting of —F, —Cl, perfluoroalkyl radicals having from 1 to about 10 carbon atoms and fluorochloroalkyl radicals having from 1 to about 10 carbon atoms.

Particularly preferred is when Y is —SO$_2$F or —COOCH$_3$; n is 0 or 1; R$_f$ and R$_f'$ are —F; X is —Cl or —F; and a+b+c is 2 or 3.

The third, and optional, monomer suitable is one or more monomers selected from the compounds represented by the general formula:

$$Y'-(CF_2)_{a'}-(CFR_f)_{b'}-(CFR_f')_{c'}-O-[CF(CF_2X')-CF_2-O]_{n'}-CF=CF_2 \tag{III}$$

where:

Y' is —F, —Cl or —Br;

a' and b' are independently 0–3;

c' is 0 or 1;

provided a'+b'+c' is not equal to 0;

n' is 0–6;

R$_f$ and R$_f'$ are independently selected from the group consisting of —Br, —Cl, —F, perfluoroalkyl radicals having from 1 to about 10 carbon atoms, and chloroperfluoroalkyl radicals having from 1 to about 10 carbon atoms; and X' is —F, —Cl, —Br, or mixtures thereof when n'>1.

Non-ionic (thermoplastic) forms of perfluorinated polymers described in the following patents are also suitable for use in the present invention because they are easily softened by heating and make it easy to bond the membrane to the electrode. Membranes which are suitable are described in the following patents: U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; European Patent Application 0,027,009. Such polymers usually have equivalent weight in the range of from about 500 to about 2000.

The copolymerization of the fluorinated olefin monomer and a monomer having sulfonic acid group or a functional group which is convertible into sulfonic acid group, if necessary, the other monomer can be carried out by methods known in the art. The polymerization can be carried out, if necessary, using a solvent such as halohydrocarbons by a catalytic polymerization, a thermal polymerization or a radiation-induced polymerization. A fabrication of the ion exchange membrane from the resulting copolymer is not critical, for example it can be known methods such as a press-molding method, a roll-molding method, an extrusion-molding method, a solution spreading method, a dispersion-molding method and a powder-molding method.

The thickness of the membrane is typically 25 to 175 microns, especially 25 to 125 microns.

A preferred example of a commercial sulfonated perfluorocarbon membrane is sold by E. I. du Pont de Nemours and Company under the trade designation NAFION ®. The sulfonic groups are chemically bound to the perfluorocarbon backbone, and prior to operation the membrane is hydrated to yield a membrane having at least about 25% water based upon dry weight of membrane.

In the case of anion exchange resins the ionic group is basic in nature and may comprise amine groups, quaternary ammonium hydroxides, the guanidine group, and other nitrogen-containing basic groups. In both cases, that is, in those where the ionic groups are acidic groups or in those cases where the ionic groups are basic, the ionizable group is attached to a polymeric compound, typical examples of which are a phenolformaldehyde resin, a polystyrene-divinyl-benzene copolymer, a urea-formaldehyde resin, a melamine-formaldehyde resin, and the like.

Hydrolysis of the functional groups of the ion exchange membrane may be carried out by any number of methods known in the art. Hydrolysis may occur before or after applying the ink to the surface of the membrane, preferably after. The membrane may be hydrolyzed (i.e., converted to its ionic form) by reacting it with, in the case of —SO$_2$F pendant groups, 25 wt. % NaOH under the following conditions: (1) immerse the film in about 25 wt. % sodium hydroxide for about 16 hours at a temperature of about 90° C.; and (2) rinse the film twice in deionized water heated to about 90° C., using about 30 to about 60 minutes per rinse.

The membrane can be reinforced by supporting said copolymer on a fabric such as a woven fabric or a net, a nonwoven fabric or a porous film made of said polymer or wires, a net or a perforated plate made of a metal.

The membrane and electrode structure may be stored in any convenient manner. Preferably, the membrane and electrode is pressed between a sheet of paper such as filter paper and stored in an airtight plastic bag.

The membrane and electrode structure is particularly useful in a fuel cell. As it is well known, fuel cells are devices capable of generating electricity by electrochemically combining an oxidizable reactant, termed a fuel, and a reducible reactant, termed an oxidant. The reactants are fluids, either liquids or gases, often hydrogen and oxygen, and usually fed continuously to the cell from separate external sources. The fuel cell is divided into compartments by the membrane and electrode structure.

Each electrode is electronically conductive, adsorbs the fuel or oxidant employed, presents an active material for the electrode reaction, and does not oxidize unduly under the operating conditions of the cell. When fuel and oxidant are concurrently and separately supplied to the different electrodes of the fuel cell, an electrical potential will develop across the electrodes. When an electrical load is provided across the electrodes, an electrical current flows therebetween, the electrical energy thus represented being generated by the electrocatalytic oxidation of fuel at one electrode and the simultaneous electrocatalytic reduction of oxidant at the other.

The membrane and electrode structure is also useful in electrolytic cells. In the operation of an electrolytic cell for the preparation of an alkali metal hydroxide by the electrolysis of an aqueous solution of an alkali metal chloride in the electrolytic cell, an aqueous solution of an alkali metal chloride is fed into the anode compartment partitioned by the cation exchange membrane and water is fed into the cathode compartment. Sodium chloride is usually used as the alkali metal chloride. It is also possible to use the other alkali metal chloride such as potassium chloride and lithium chloride. The corresponding alkali metal hydroxide can be produced from the aqueous solution in high efficiency and a stable condition for a long time. The electrolytic cell using the ion exchange membrane having the electrode layers can be a unipolar or bipolar type electrolytic cell.

EXAMPLES

Membrane and electrode structures were prepared and tested as follows:

Membrane

The ion exchange membrane is the NAFION ® NE 112F membrane (made and sold by E. I. du Pont de Nemours and Company). The membrane has a thickness of 0.05 mm (2 mil) in the unhydrolyzed form. The ion exchange polymer is a sulfonyl fluoride polymer having an equivalent weight of 1100. The membranes are cut into 7.6 cm by 7.6 cm (3 inch by 3 inch) sheets.

Fuel Cell

The membranes are tested in a test fuel cell prepared in accordance with pending patent application Ser. No. 07/824,414, J. Kelland and S. Braun to Analytic Power Corporation. The unitized cell is placed between the plates of a test cell fixture and the entire test fixture is placed in a single cell test stand. The compressive load on the cell is about 2760 kPa (400 psi) and is applied in a press. The cell is preconditioned using humidified hydrogen and oxygen reactants. When the preconditioning is complete and the cell is at a temperature of about 82° C. (180° F.), and a pressure of about 6.9 kPa (80 psi), the cell is run at varying loads. The reactant utilizations are relatively low, less than 20%. The loads are simple resistors which are placed in series with the cell. A shunt is used to determine the cell current and the voltages are taken from end plate to plate. The cell voltages reported include electrode polarizations and internal resistive losses as well as losses in conducting the electricity to the end plates of the test fixture.

Electrode Ink

The electrode ink is prepared in a preweighed bottle with a magnetic stirrer. The following components are added to the bottle: 2.6 gm perfluorinated sulfonic acid NAFION ® solution (made from 5% by weight NAFION ® polymer, 50% isopropyl alcohol, 25% methanol and 20% water), 390 mg. 1-methoxy 2-propanol; 2 ml. isopropanol; and 487.9 mg. catalyst (made by Precious Metals Corporation) having 20% platinum on VULCAN ® carbon support. The ink is stirred in the capped bottle for 15–30 minutes. The electrode ink is sufficient to prepare approximately 10 electrodes of about 7 cm by 7 cm (2.75 inches by 2.75 inches).

Membrane and Electrode Fabrication

The precut membrane sheet is placed on a MYLAR ® (commercially available from E. I. du Pont de Nemours and Company) screen with a 7 cm by 7 cm (2.75-inch by 2.75-inch) target. The electrode ink is loaded on the screen and pressed through the screen using a standard hard rubber squeegee. Excess ink is removed from the screen and returned to the bottle. The membrane is removed from the screen and warmed under a lamp. The screen printing process is repeated until about 80 mg. of ink is applied to the membrane—typically two to four applications of ink. The membrane is then inverted on the screen. The foregoing steps are repeated in order to print the electrode ink on the other surface of the membrane.

The membrane is then placed between two glass-reinforced TEFLON ® sheets which have been dusted with VULCAN ® particles. The composite is then placed between TEFLON ®/Graflex platens. Pressure is applied at 2070 kPa (300 psi) (calculated using the entire area of the platen) at 127° C. (260° F.) for two minutes.

The pressed membrane is removed from in between the glass-reinforced TEFLON ® sheets and the membrane and electrode structure is hydrolyzed by immersing the structure in a solution of 69.0 ml water, 25.0 ml isopropyl alcohol and 6.0 gm. sodium hydroxide (solid solute) for one hour. The membrane and electrode structure is then removed and washed with large amounts of water. The hydrolyzed membrane and electrode structure is then soaked in 5–10% (by weight) 1–2 Normal $H_2SO_4$ aqueous solution at 75° C. for 15 minutes.

The membrane and electrode structure may be pressed between sheets of filter paper and stored in plastic bags for subsequent use or installed in the fuel cell. In the fuel cell, the membrane and electrode structure is tested for voltage at varying amps per square foot.

The fuel cell was operated at 37.8° C. and 82.2° C. at 101 kPa (1 atm) and 638 kPa (6.3 atm) using air as the oxidant and at 82.2° C. at 638 kPa (6.3 atm) using oxygen as the oxidant. The results are reported in Table 1 below:

TABLE 1

| Temperature = 37.8° C. Pressure = 101.kPa Oxidant = Air | | Temperature = 82.2° C. Pressure = 638 kPa Oxidant = Air | | Temperature = 82.2° C. Pressure = 638 kPa Oxidant = Oxygen | |
|---|---|---|---|---|---|
| Amps per ft$^2$ | Voltage | Amps per ft$^2$ | Voltage | Amps per ft$^2$ | Voltage |
| 116 | 0.766 | 0 | 0.958 | 0 | 0.960 |
| 168 | 0.721 | 5 | 0.961 | 7 | 0.987 |
| 208 | 0.683 | 6 | 1.007 | 10 | 0.918 |
| 286 | 0.623 | 15 | 0.993 | 46 | 0.915 |
| 361 | 0.574 | 136 | 0.836 | 106 | 0.897 |
| 384 | 0.542 | 300 | 0.824 | 149 | 0.866 |
| 416 | 0.520 | 354 | 0.815 | 329 | 0.837 |
| 476 | 0.459 | 569 | 0.760 | 408 | 0.776 |
| 500 | 0.405 | 651 | 0.744 | 551 | 0.762 |
| | | 754 | 0.715 | 691 | 0.743 |
| | | 960 | 0.709 | 962 | 0.743 |
| | | 2063 | 0.390 | 1000 | 0.726 |
| | | 2406 | 0.398 | 1483 | 0.455 |
| | | 2636 | 0.222 | 2622 | 0.414 |
| | | | | 3380 | 0.305 |

We claim:

1. A method for making a membrane and electrode, structure comprising contacting at least one surface of an ion exchange membrane with an electrode ink comprising:
   (a) catalytically active particles; and
   (b) a hydrocarbon having one or more ether, epoxy or ketone linkages and an alcohol group.

2. The method of claim 1 in which the hydrocarbon is 1-methoxy 2-propanol.

3. The method of claim 1 in which the hydrocarbon is nonsolid at the processing temperatures of the structure.

4. The method of claim 1 in which the hydrocarbon is selected from the group of 1-ethoxy-2-propanol; 1-methoxy 2-methyl 2-propanol; 1-isopropoxy 2-propanol; 1-propoxy 2-propanol; 2-phenoxy 1-propanol; 2-ethoxy 1-propanol; 2,3-ethoxy 1-propanol; 2-methoxy 1-propanol; 1-butoxy 2-propanol; or mixtures thereof.

5. The method of claim 1 in which the electrode ink further comprises a sulfonyl fluoride polymer.

6. The method of claim 5 in which the polymer is hydrolyzed.

7. The method of claim 5 in which the polymer is unhydrolyzed.

8. The method of claim 5 in which the polymer is in a solution, suspension or dispersion of alcohol and water.

9. The method of claim 1 in which the catalytically active particle comprises a platinum group metal.

10. The method of claim 8 in which the platinum group metal is on a carbon support.

11. The method of claim 1 in which the catalytically active particles are present at about 5–40 weight percent.

12. The method of claim 1 in which the hydrocarbon is present at about 50–95 weight percent.

13. The method of claim 1 wherein the electrode ink is sprayed on the surface of the membrane.

14. The method of claim 1 wherein the electrode ink is brushed on the surface of the membrane.

15. The method of claim 1 wherein the electrode ink is screen printed on the surface of the membrane.

16. The method of claim 1 wherein the electrode ink is coated on the surface of the membrane in a plurality of applications.

17. The method of claim 1 further comprising bonding the electrode ink to the surface of the membrane under pressure at temperatures of up to about 300° C.

18. The method of claim 1 in which the electrode ink is applied to the surface of a substrate and then the electrode ink layer is transferred from the substrate to the surface of the membrane.

19. The method of claim 18 in which the electrode ink layer is transferred to the surface of the membrane by hot pressing.

20. The method of claim 1 wherein the electrode ink is printed on the surface of the membrane in a plurality of applications.

* * * * *

UNITED STATES PATENT AND TRADEMARK OFFICE
CERTIFICATE OF CORRECTION

PATENT NO. : 5,415,888
DATED : May 16, 1995
INVENTOR(S) : Shoibal Banerjee, Walther G. Grot, David P. Bloomfield It is certified that error appears in the above-identified patent and that said Letters Patent is hereby corrected as shown below:

Title page, item [73] Assignee should be corrected to read:

-- [73] Assignee: E. I. du Pont de Nemours and Company, Wilmington, Del. and H Power Corporation, Belleville, N.J. --

Signed and Sealed this

First Day of August, 1995

Attest:

BRUCE LEHMAN

Attesting Officer     Commissioner of Patents and Trademarks